March 18, 1924.
F. E. MORRIS ET AL
COOKING APPARATUS AND METHOD
Filed Nov. 4, 1919    2 Sheets-Sheet 1
1,486,986
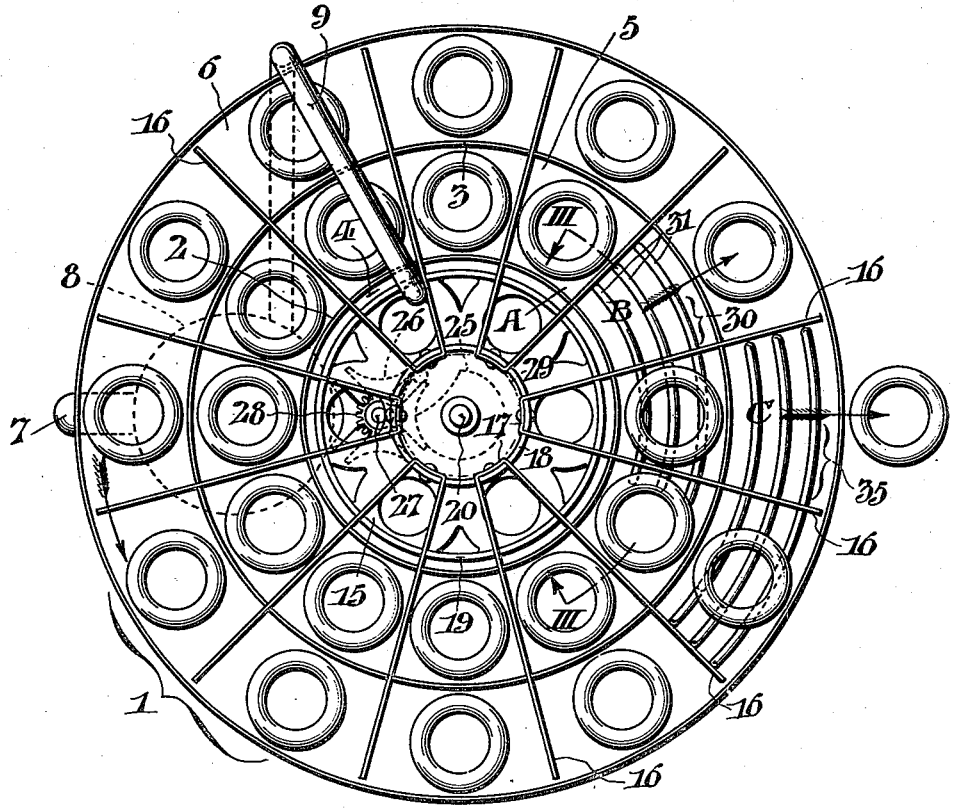
FIG. I.
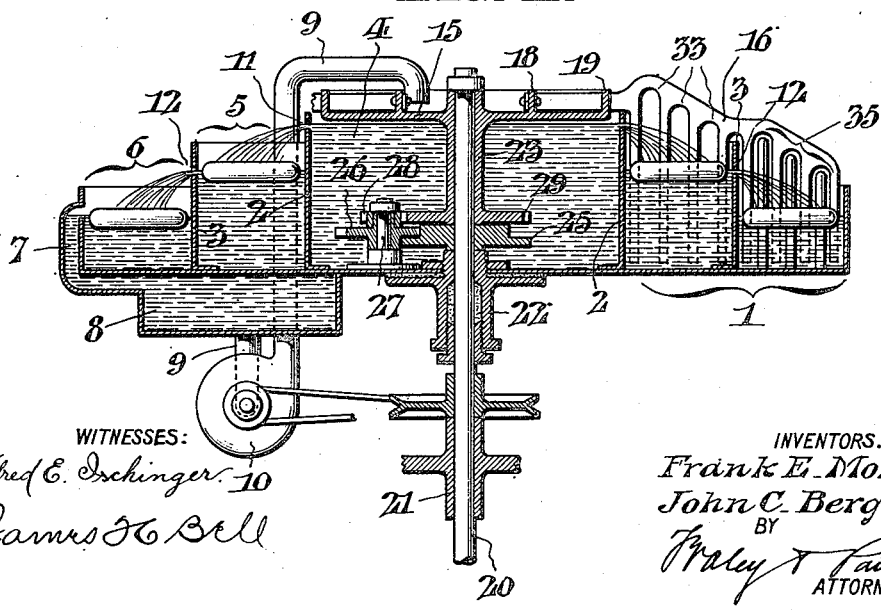
FIG. II.
WITNESSES:
INVENTORS.
Frank E. Morris &
John C. Bergner,
BY
ATTORNEYS.

March 18, 1924.                                                                1,486,986
F. E. MORRIS ET AL
COOKING APPARATUS AND METHOD
Filed Nov. 4, 1919          2 Sheets-Sheet 2
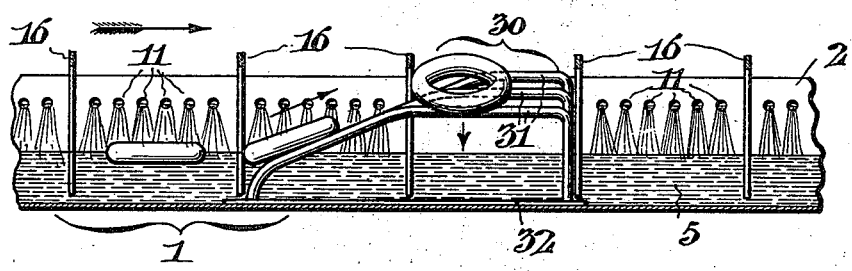
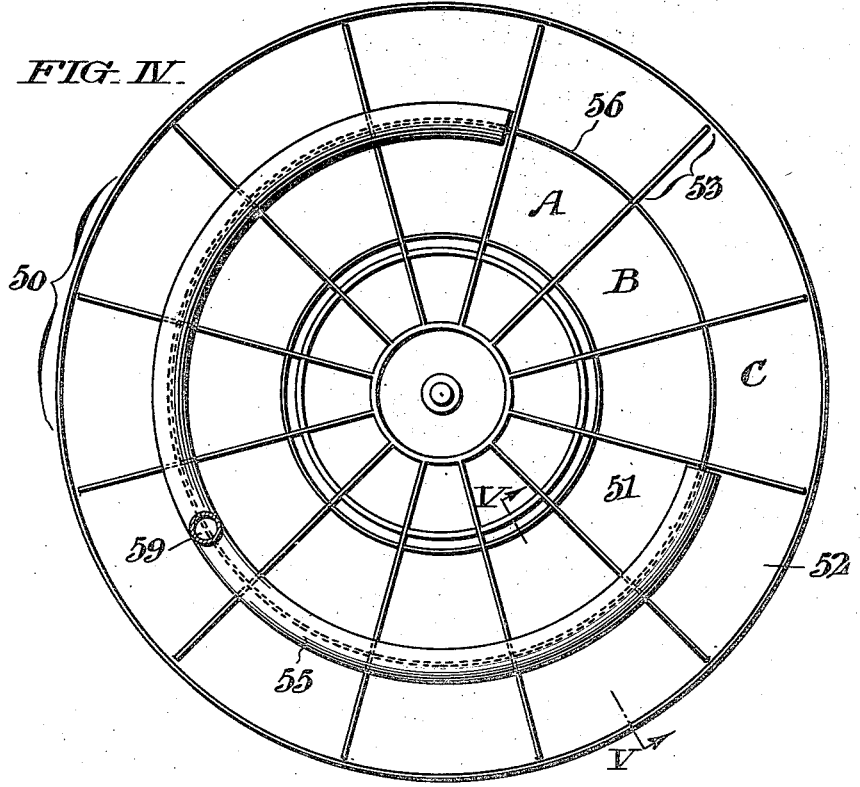
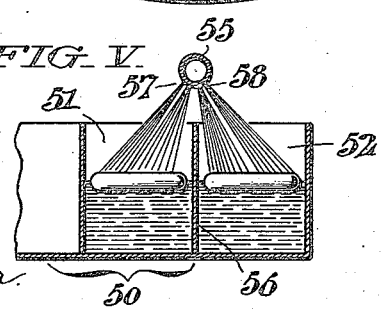
WITNESSES:
INVENTORS:
Frank E. Morris &
John C. Bergner,
BY
ATTORNEYS.

Patented Mar. 18, 1924.

1,486,986

UNITED STATES PATENT OFFICE.

FRANK E. MORRIS AND JOHN C. BERGNER, OF PHILADELPHIA, PENNSYLVANIA.

COOKING APPARATUS AND METHOD.

Application filed November 4, 1919. Serial No. 335,599.

*To all whom it may concern:*

Be it known that we, FRANK E. MORRIS and JOHN C. BERGNER, citizens of the United States, residing in Philadelphia, in the county of Philadelphia and State of Pennsylvania, have invented certain new and useful Improvements in Cooking Apparatus and Methods, whereof the following is a specification, reference being had to the accompanying drawings.

The invention relates to that class of cooking wherein the process is effected by the employment of a cooking liquor.

It is our aim to improve the quality, uniformity and appearance of the product; to make the operation continuous, simple, convenient, and as economical as possible; and, in general, to secure the usual advantages of efficient automatic manufacture in quantity. We also aim to make the apparatus employed simple and rugged in construction; easy and inexpensive to manufacture; convenient, durable, and free from derangement in use; and susceptible of automatic operation with a minimum of attention.

As regards the cooking process, our invention is especially concerned with operations in the nature of frying. It is advantageous, we have found, to apply the hot liquor to the article being cooked in like measure ("pari passu") in both sides,—so as to advance the cooking of the two sides from stage to stage in a corresponding manner substantially throughout the cooking period,—and without more than partial immersion. As hereinafter described, the article is maintained partially immersed as to one side, and the other side or portion is exposed at or above the surface of the liquor and is sprayed therewith. This mode of operation not only renders the cooking of the two sides simultaneous, and much more expeditious than under the usual practice of first completely cooking the article on one side and then turning it over to cook completely on the other, but also affords a mechanical advantage in obviating the necessity of turning the article at all in order to cook it fully. Advance of the cooking of the two sides of the articles from stage to stage substantially in like measure tends, in some cases, to minimize blemishes of their outer surface that are objectionably numerous when the articles are cooked on one side before cooking on the other has seriously begun; while the partial immersion of the articles affords support tending to obviate distortion without risk of serious defects of quality sometimes liable to arise if the articles were totally immersed throughout the cooking.

As regards the cooking apparatus, our invention presents various novel combinations and features of operation and construction (besides means for spraying the articles according to the mode of operation above referred to) that are valuable and useful, even apart from one another and from other details of the apparatus herein shown,—as will readily be apparent to those skilled in the art. In particular, the articles may be progressed in the liquor, during the cooking operation, through successive subdivisions or compartments of the cooking receptacle, and subjected to the spray in each compartment. Our invention is very suitable for the cooking of articles (like the ordinary cruller or doughnut of the annular form illustrated) whose configuration and consistency render them liable to deformation during or at the commencement of cooking.

These and other points and features of our invention will be readily understood from the description hereinafter of the best forms of embodiment at present known to us, while the scope and essentials of the invention in its various phases and aspects will be indicated in our claims.

In the accompanying drawings, Fig. I, is a plan view of a cooking apparatus conveniently illustrating our invention.

Fig. II, is an axial sectional view of the same, so skeletonized, as to show only the essential working parts thereof to the exclusion of any mounting structure by which the apparatus may be supported.

Fig. III, is a diagrammatic sectional view in the form of a linear development along the arc indicated by the arrows III—III in Fig. I.

Fig. IV, is a plan view, similar to Fig. I, of a modified embodiment of our invention;

Fig. V, is a fragmentary cross sectional view of the same, as viewed in the directions of the arrows V—V in Fig. IV.

Referring first to Figs. I, and II, the structure herein illustrated, comprises a receptacle 1, for the cooking liquor, said receptacle being divided by concentric partitions 2, 3, into a series of compartments 4, 5 and 6. Partition 2, is substantially higher than partition 3, and the latter in turn higher than the outer wall of the receptacle, so that the liquor levels may be accordingly maintained at various heights in the several compartments. In the operation of the apparatus, the cooking liquor flows from one compartment to another and upon the articles therein, which are shown partially immersed and afloat in the liquor and correspondingly exposed above its surface. In the present instance, articles are definitely and positively progressed through the two outer channels or compartments of the series, by means which will be subsequently described. In order to prevent flow of the liquor from the outer channel 6, over the wall of the receptacle, we have provided a discharge outlet duct 7, which communicates with a reservoir 8. A pipe 9, leads from the latter to a point of discharge above the inner compartment 4. A pump 10, interposed in said pipe, serves to maintain the circulation of a sufficient quantity of the liquor to effect the desired overflow, as above noted. In order that the successive overflows from the several compartments may be broken up to effect a more general distribution, we prefer to provide each of the partitions 2 and 3, with a horizontal series of outlet orifices 11 and 12 respectively, said orifices being disposed at different heights in accordance with the relative disposal of the partitions.

The articles to be cooked are progressed through the channels 5 and 6, of the receptacle, by means including a succession of moving engagement members, in the form of a carrier having a central hub member 15, to which are attached a number of radial engagement members or vanes 16. These vanes are preferably integrally formed in pairs, the joining segment 17, of each of such pairs, being secured to an annular ridge 18, formed on the hub member 15. Said member 15 is also formed with a peripheral ridge 19, which is radially slotted to engage the vanes in order to assist in sustaining them, and at the same time, to maintain them in the proper spaced relation. The carrier is operated by means of a central driving shaft 20, which may be actuated by any convenient means. Said shaft is journalled near its lower end, in a fixed bearing 21, and passes through a stuffing box 22, at the bottom of the receptacle 1. About its upper end, is loosely mounted the sleeve 23, of the carrier. Fixed to the portion of the shaft 20, within the compartment 4, is the driving member 25, of a Geneva movement, which actuates a slotted companion member 26, mounted for free rotation about a fixed stud 27. Secured to the member 26, in such a manner as to rotate therewith, is a spur pinion 28, which meshes with a gear 29, fixed to, or forming a part of the integral sleeve 23, of the carrier hub member 15. The gear ratio is such that the carrier is rotated intermittently in steps corresponding to the spacing of its radial vanes.

For effecting the transfer of the articles being cooked, from the inner channel 5, to the outer channel 6, we have provided means for engaging them cooperative with the progressing means 16,—comprising a combined elevating and deflecting device 30 in the path of progression of the articles, best shown in Figs. I, and III. This device is preferably a stationary or fixed composite structure comprising a series of arcuate members or units 31, of stout wire, so bent collectively considered, as to bring about the action above referred to. These units are preferably set into a supporting plate 32, which may be secured to the bottom of the receptacle in any convenient manner. It will be noted, more especially from Fig. II, that in order to clear the several units of this device 30, the vanes of the carrier are cut away or vertically slotted, grid fashion, as shown at 33, in correspondence with the location of the units 31. By the device 30, it will be seen, the articles are raised from the liquor under their impulsion by the progressing members 16, above the outwardly adjacent partition 3, and then deflected and filled so as automatically to slide sidewise from the compartment 5. After cooking is completed the articles are finally ejected, from the apparatus, by an elevating and deflecting device 35, similar to that just described, and operating upon the same principle.

In the operation of this form of our invention, the continuous rotation of the shaft 20, is translated, through the Geneva movement and cooperating gears 27 and 28, into intermittent rotation of the carrier in the direction of the arrow in Figs. I, and III, so that the inner series of its cells formed conjointly by the vanes of the latter and the partition 3, of the receptacle, are successively presented to a station indicated by the letter "A," at which the articles are introduced. The cell at the time occupying an adjacent position, is simultaneously presented at a transfer station represented by the letter "B." Thus it will be seen that each of the articles introduced at the station "A," before being transferred to the outer channel of the receptacle at the station "B," will be obliged to travel substantially about the entire length of the inner channel. As the formations successively approach the station "B," they are gradually raised, and finally transferred to the outer channel of the receptacle by the device 30, as already mentioned. After such transfer, the articles are again carried about the receptacle for substantially a complete rotation of the carrier, and finally ejected at a station "C," by the device 35. During the passages of the articles through the machine, as above explained, they are at the same time constantly subjected to the several streams of the cooking liquor sprayed through the orifices of the partitions 2 and 3, so as to be simultaneously cooked upon both sides.

Referring now to the form of our invention, shown in Figs. IV and V, the receptacle is here indicated at 50, its inner channel at 51, and its outer channel at 52, and the intermittently rotating carrier at 53. The carrier shown in this connection may be of a construction similar to that described in the previous form and need not, therefore, be further detailed. Here again the three stations are represented at "A," "B" and "C," and since the operation of the transfer, and the ejecting means are already understood, they have been omitted from the illustrations. In this type of our invention, the spraying means is in the form of a pipe 55, which is disposed above, and concentric with the dividing partition 56, between the channels 51 and 52. This pipe, as shown in Fig. V, is provided with two sets of discharge orifices 57 and 58, one set directed into the inner channel, and the other into the outer channel, so that the articles travelling through the apparatus are sprayed in a manner similar to that previously explained. The cooking liquor may be delivered to the pipe 55, from any convenient source, through a branch 59, shown in Fig. IV. If desired, the channels may be provided with individual spray pipes instead of the single common pipe shown in the illustrations.

It will also be seen that the number of compartments or channels into which the receptacle is divided may be increased indefinitely and a corresponding number of transfer devices provided, without departing from the spirit of our invention, and we therefore do not wish to be strictly limited to the precise structure herein illustrated.

Having thus described our invention, we claim:

1. The method of frying articles with hot liquor which consists in applying such liquor to both sides of them, with partial immersion, in like measure substantially throughout the cooking period, so as to advance the cooking of the two sides from stage to stage in a corresponding manner.

2. The method of frying articles with hot liquor, without necessity of turning them, which consists in maintaining the articles partly immersed in the hot liquor and partly exposed above its surface, and spraying their exposed portions with the hot liquor.

3. The method of frying buoyant articles with hot liquor, without necessity of turning them, which consists in spraying the articles with the hot liquor while afloat therein at its surface.

4. In apparatus for frying articles with hot liquor, the combination of a receptacle for the liquor permitting partial immersion of the articles in the liquor therein, and means for spraying the liquor upon the exposed portions of the articles, so as to enable them to be completely cooked without necessity for turning.

5. In apparatus for frying articles with hot liquor, the combination of a receptacle for cooking liquor; means for progressing the articles to be cooked through the receptacle; and means for spraying the cooking liquor upon the articles during their travel through the apparatus.

6. In apparatus for frying articles with hot liquor, the combination of a receptacle for cooking liquor; means for progressing the articles to be cooked through the receptacle; means for spraying the cooking liquor upon the articles during their travel through the receptacle; and means for ejecting the articles from the apparatus after the completion of the cooking process.

7. In apparatus for frying articles with hot liquor, the combination of a receptacle for cooking liquor; means for progressing the articles to be cooked over a circuitous course in said receptacle; and means for spraying the cooking liquor upon the articles during their travel through the receptacle.

8. In apparatus of the character described, the combination of a receptacle for cooking liquor subdivided into a number of compartments; means for progressing the articles to be cooked through the compartments; and means for maintaining the liquor at different levels in the said compartments, so that the same may overflow successively from one to another, and onto the articles therein.

9. In apparatus of the character described, the combination of a receptacle for cooking liquor subdivided into a number of compartments; means for progressing the articles to be cooked through the compartments; means for maintaining the liquor at different levels in the said compartments, so that the same may overflow successively from one to another, and onto the articles therein; and means for maintaining a circulation of the liquor between the terminal compartments of the series.

10. In apparatus of the character described, the combination of a receptacle for cooking liquor subdivided into a number of compartments; means for progressing the articles to be cooked through the compartments; means for maintaining the liquor at different levels in said compartments, so that the same may overflow successively from one to another and onto the articles therein; and a pump for maintaining circulation of the liquor between the terminal compartments of the series.

11. In apparatus of the character described, the combination of a receptacle for cooking liquor; means for progressing the articles to be cooked through the receptacle; and partitions subdividing the receptacle into a number of compartments, said partitions having overflow orifices located at different heights, so that the cooking liquor may overflow, in the form of sprays, successively from one to another, and directly upon the articles in the compartments.

12. In apparatus for frying articles with hot liquor, the combination of a circular receptacle subdivided into a number of concentric compartments or channels; means for progressing the articles to be cooked through the said compartments or channels; and means for spraying the cooking liquor over the articles in the channels during their travel therethrough.

13. In apparatus for frying articles with hot liquor, the combination of a receptacle for cooking liquor subdivided into a number of compartments; means for progressing the articles to be cooked through the receptacle; means for transferring the articles from one compartment to another during their travel through the receptacle; and means for simultaneously spraying cooking liquor thereupon.

14. In apparatus of the character described, the combination of a receptacle for cooking liquor subdivided into a number of compartments; means for progressing the articles to be cooked through the compartments; and means cooperating with said progressing means for engaging the articles to transfer the articles from one compartment to another during their travel through the apparatus.

15. In apparatus of the character described, the combination of a receptacle for cooking liquor sub-divided into a number of compartments; means for progressing the articles to be cooked though the compartments; and a transfer device interposed in the path of progression of the articles, in each of the compartments, for engaging the articles and cooperating with the progressing means, to elevate them from the cooking liquor, and for deflecting them from the compartments.

16. In apparatus of the character described, the combination of a receptacle for cooking liquor subdivided into a number of compartments; means for progressing the articles to be cooked though said compartments; and a transfer device in the form of a fixed structure interposed in the path of progression of the articles in each compartment, of such configuration as first to elevate the articles from the cooking liquor, whilst under the propulsion of the progressing means, and then to tilt the same at an angle, so that they may automatically slide from the compartment.

17. In apparatus for cooking articles with hot liquor, the combination with a cooking compartment, and means for progressing articles to be cooked through said compartment, of means in the path of progression of the articles as aforesaid for engaging them and elevating them from the liquor under their impulsion by said progressing means, and for deflecting them sidewise from the compartment.

18. In apparatus for cooking articles with hot liquor, the combination with a cooking compartment, and means for progressing articles to be cooked through said compartment, of means in the path of progression of the articles as aforesaid for engaging them and elevating them from the liquor under their impulsion by said progressing means, and for tilting them to slide sidewise from the compartment.

19. In apparatus for cooking articles with hot liquor, the combination of means including a succession of vertically slotted members for engaging and progressing the articles in the liquor, and an elevating and deflecting transfer device in the path of progression of the articles as aforesaid, including a group of members for engaging the articles arranged in correspondence with the slots of said engaging members.

20. In apparatus of the character described, the combination of a circular receptacle for cooking liquor subdivided by partitions into a number of concentric compartments or channels; a rotatable carrier having a series of radial vanes adapted to progress the articles to be cooked through the channels of the receptacle; and a transfer device interposed in the path of progression of the articles in each compartment, and consisting of a group of bent wire units of such configuration as to form, conjointly, a structure by which the articles are first elevated from the cooking liquor, whilst under the propulsion of the vanes of the carrier and then tilted to slide automatically from the compartment, the vanes of the carrier being appropriately cut away at intervals to clear the component units of the transfer devices and the subdividing partitions of the receptacle.

In testimony whereof, we have hereunto signed our names at Philadelphia, Pennsylvania, this third day of November, 1919.

FRANK E. MORRIS.
JOHN C. BERGNER.

Witnesses:
JAMES H. BELL,
E. L. FULLERTON.